May 19, 1964 D. McGLASSON, SR 3,133,996

SHOULDER REST FOR TELEPHONE HANDSETS

Filed Sept. 15, 1961

INVENTOR.
DAILY McGLASSON, SR.
BY
Kimmel & Crowell
ATTORNEYS.

United States Patent Office 3,133,996

Patented May 19, 1964

3,133,996

SHOULDER REST FOR TELEPHONE HANDSETS

Daily McGlasson, Sr., 806 N. McLeansboro, Benton, Ill.

Filed Sept. 15, 1961, Ser. No. 138,326
2 Claims. (Cl. 179—157)

This invention relates to a shoulder rest for telephone handsets and has as its primary object the provision of such a rest which will position both the earpiece and the mouthpiece of the handset in a position closely adjacent the ear and mouth, respectively, of the user and retain the same in position, leaving both hands free for other work.

An additional object of the invention is the provision of a device of this character which, once applied to a telephone handset, needs no further adjustment, and may be employed immediately upon lifting the instrument.

A further object of the invention is the provision of such a device which is so positioned as to locate the earpiece and the mouthpiece in the most convenient location for easy reception and transmission.

Still another object of the invention is the provision of a device of this character which is sturdy and durable in construction, reliable and efficient in operation, and relatively simple and inexpensive to mainufacture and assemble.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawing.

Similar reference characters refer to similar parts throughout the several views of the drawing.

Figure 2:
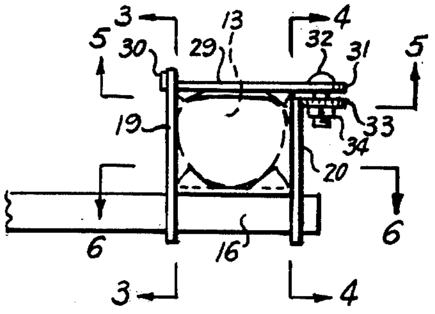
FIGURE 2 is an enlarged sectional view taken substantially along the line 2—2 of FIG. 1 as viewed in the direction indicated by the arrows.
Figure 1:
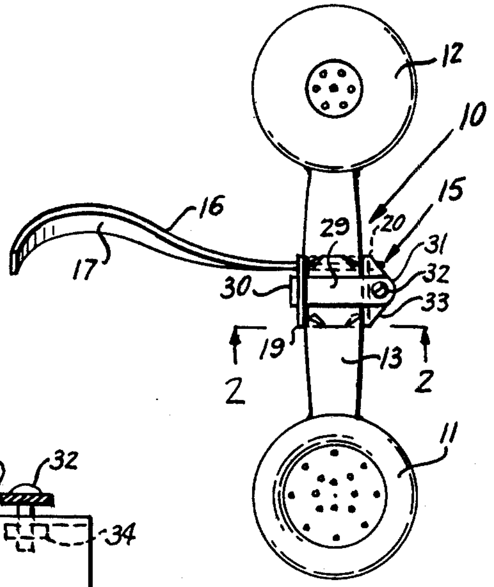
FIGURE 1 is a bottom or front plan view of a telephone handset showing the attachment of the instant invention applied thereto.
Figure 3:
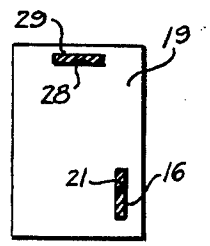
FIGURE 3 is a sectional view taken substantially along the line 3—3 of FIG. 2 as viewed in the direction indicated by the arrows.
Figure 4:
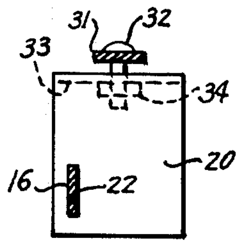
FIGURE 4 is a sectional view taken substantially along the line 4—4 of FIG. 2 as viewed in the direction indicated by the arrows.
Figure 5:
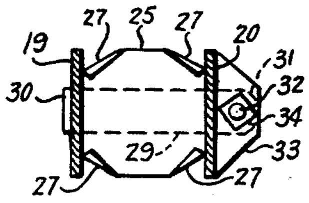
FIGURE 5 is a sectional view taken substantially along the line 5—5 of FIG. 2 as viewed in the direction indicated by the arrows.
Figure 6:
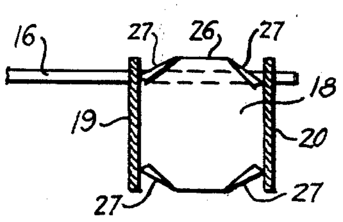
FIGURE 6 is a sectional view taken substantially along the line 6—6 of FIG. 2 as viewed in the direction indicated by the arrows.

Having reference now to the drawings in detail, there is generally indicated at 10 a conventional telephone handset which includes a mouthpiece 11 and an earpiece or receiver 12 connected by the usual bar 13. The device of the instant invention is generally indicated at 15, and comprises an elongated arcuate flat projecting member 16 which is reversely curved as at 17, and which is adapted to rest on the shoulder of the person using the telephone with the earpiece 12 adjacent the ear and the mouthpiece 11 close to the mouth. The strap 16 is preferably constructed of rigid material such as metal or the like and may be covered with rubber or plastic, if desired. A clamping means for securing the member 16 to the shank or hand grip 13 of the handset is provided and takes the form of a substantially U-shaped clamping member comprising a bottom portion 18 with upwardly extending side walls 19 and 20 extending upwardly on either side of the member 13 provided with aligned openings 21 and 22 through which the bar 16 extends.

End walls 25 and 26 of materially less height than walls 19 and 20 are also provided and have at their upper extremities inwardly turned corner portions 27 which rest on member 13 firmly to secure the clamp in position, the side and end walls forming a box-like member.

The wall 19 adjacent its upper end is provided with an opening 28 through which extends a clamping bar 29, the latter being provided with an upwardly turned end flange 30 for securing the same in the opening. The opposite end of clamping bar 29 extends beyond the end wall 20 as indicated at 31 and is provided with an opening for the reception of a screw 32. The screw 32 also extends through a suitable opening in the tongue 33 which extends outwardly at right angles to the wall 20, and the assembly is clamped in position by means of a nut 34.

The arrangement is thus such that the shoulder suspending portion 16 is firmly secured to the shank or hand grip of the telephone, and when placed on the shoulder, holds both the earpiece 12 and the mouthpiece 11 in such position as to be most convenient to the ear and mouth, respectively, at the same time leaving the hands of the operator free for any desired purpose.

The device thus facilitates writing or other manual work during a telephone conversation, thus resulting, by enabling the user to have both hands free, in material saving of time and effort.

From the foregoing it will now be seen that there is herein provided a shoulder rest for telephone handsets which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In a shoulder support for telephone handsets of the type having an earpiece, a mouthpiece, and a handgrip connecting said earpiece and said mouthpiece, an elongated strip curved to fit the shoulder extending transversely from said handgrip, and means clamping said strip to said handgrip, said last-mentioned means including a box-like member having side walls passing on opposite sides of said handgrip and extending therebeyond said strip extending through openings in the extending portions of said side walls.

2. In a shoulder support for telephone handsets of the type having an earpiece, a mouthpiece, and a handgrip connecting said earpiece and said mouthpiece, an elongated strip curved to fit the shoulder extending transversely from said handgrip, means clamping said strip to said handgrip, said last-mentioned means including a box-like member having side walls passing on opposite sides of said handgrip and extending therebeyond said strip extending through openings in the extending portions of said side walls, and a transverse band extending between said side walls at the end thereof opposite said strip and screw means securing said band to said box-like member in clamping relation.

References Cited in the file of this patent

UNITED STATES PATENTS

| | | |
|---|---|---|
| 2,525,699 | Maldonado | Oct. 10, 1950 |
| 2,863,954 | Renneker | Dec. 9, 1958 |

FOREIGN PATENTS

| | | |
|---|---|---|
| 1,084,647 | France | July 7, 1954 |